United States Patent
Parvataneni et al.

(10) Patent No.: US 11,343,311 B2
(45) Date of Patent: May 24, 2022

(54) EDGE COMPUTING FOR INTERNET OF THINGS SECURITY WITH BLOCKCHAIN AUTHENTICATION

(71) Applicant: Verizon Patent and Licensing Inc., Arlington, VA (US)

(72) Inventors: Raghuram Parvataneni, Edison, NJ (US); Anil K. Guntupalli, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 280 days.

(21) Appl. No.: 16/690,551

(22) Filed: Nov. 21, 2019

(65) Prior Publication Data

US 2021/0160314 A1    May 27, 2021

(51) Int. Cl.
*H04L 29/06* (2006.01)
*H04L 67/1042* (2022.01)
*H04L 9/32* (2006.01)
*H04L 9/06* (2006.01)

(52) U.S. Cl.
CPC ........ *H04L 67/1046* (2013.01); *H04L 9/0643* (2013.01); *H04L 9/3265* (2013.01); *H04L 9/3273* (2013.01); *H04L 2209/38* (2013.01)

(58) Field of Classification Search
None
See application file for complete search history.

(56) References Cited

U.S. PATENT DOCUMENTS

| | | | | |
|---|---|---|---|---|
| 2019/0034919 A1* | 1/2019 | Nolan | .................. | H04L 9/3239 |
| 2019/0034920 A1* | 1/2019 | Nolan | .................. | H04L 9/0894 |
| 2019/0034936 A1* | 1/2019 | Nolan | .................. | G06Q 20/42 |
| 2019/0042315 A1* | 2/2019 | Smith | .................. | G06F 9/5027 |
| 2019/0043050 A1* | 2/2019 | Smith | .................. | G06Q 20/223 |
| 2019/0140919 A1* | 5/2019 | Smith | ................. | H04L 41/5019 |
| 2020/0084202 A1* | 3/2020 | Smith | ..................... | H04L 67/28 |
| 2020/0195495 A1* | 6/2020 | Parker | ............... | H04M 15/8038 |
| 2020/0275273 A1* | 8/2020 | Smith | .................. | H04W 12/35 |
| 2020/0374700 A1* | 11/2020 | Smith | .................. | H04L 9/3247 |
| 2021/0045187 A1* | 2/2021 | Sun | ........................ | H04W 80/10 |
| 2021/0160314 A1* | 5/2021 | Parvataneni | .......... | H04L 9/3239 |
| 2021/0176334 A1* | 6/2021 | Stockert | ............... | H04L 9/3239 |

* cited by examiner

*Primary Examiner* — Jeffery L Williams

(57) ABSTRACT

A device may include a memory storing instructions and processor configured to execute the instructions to receive, by a first blockchain node and via a first base station, a message from a first Internet of Things (IoT) device to a second IoT device, wherein the device corresponds to a first multi-access edge computing (MEC) device located in a first MEC network associated with the first base station. The processor may be further configured to authenticate, by the first blockchain node, the first IoT device using a blockchain associated with a group of IoT devices and send, by the first blockchain node, the message to a second blockchain node in a second MEC device in a second MEC network associated with a second base station servicing the second IoT device, in response to authenticating the first IoT device using the blockchain associated with the group of IoT devices.

20 Claims, 9 Drawing Sheets

EDGE COMPUTING FOR INTERNET OF THINGS SECURITY WITH BLOCKCHAIN AUTHENTICATION

BACKGROUND INFORMATION

To satisfy the needs and demands of users of mobile communication devices, providers of wireless communication services continue to improve and expand available services as well as networks used to deliver such services. One enhancement to broadband wireless networks is the use of Multi-access Edge Computing (MEC) architecture. The MEC architecture includes devices, which have previously been implemented in a core network or cloud center, located at the network edge relative to the point of attachment of a wireless communication device to a wireless access network. Devices in a MEC network enable high computing loads to be offloaded from the core network to the edge and provide various services and applications to wireless communication devices with reduced latency. However, managing a large number of MEC devices poses various challenges.

DETAILED DESCRIPTION OF PREFERRED EMBODIMENTS

Figure 1:
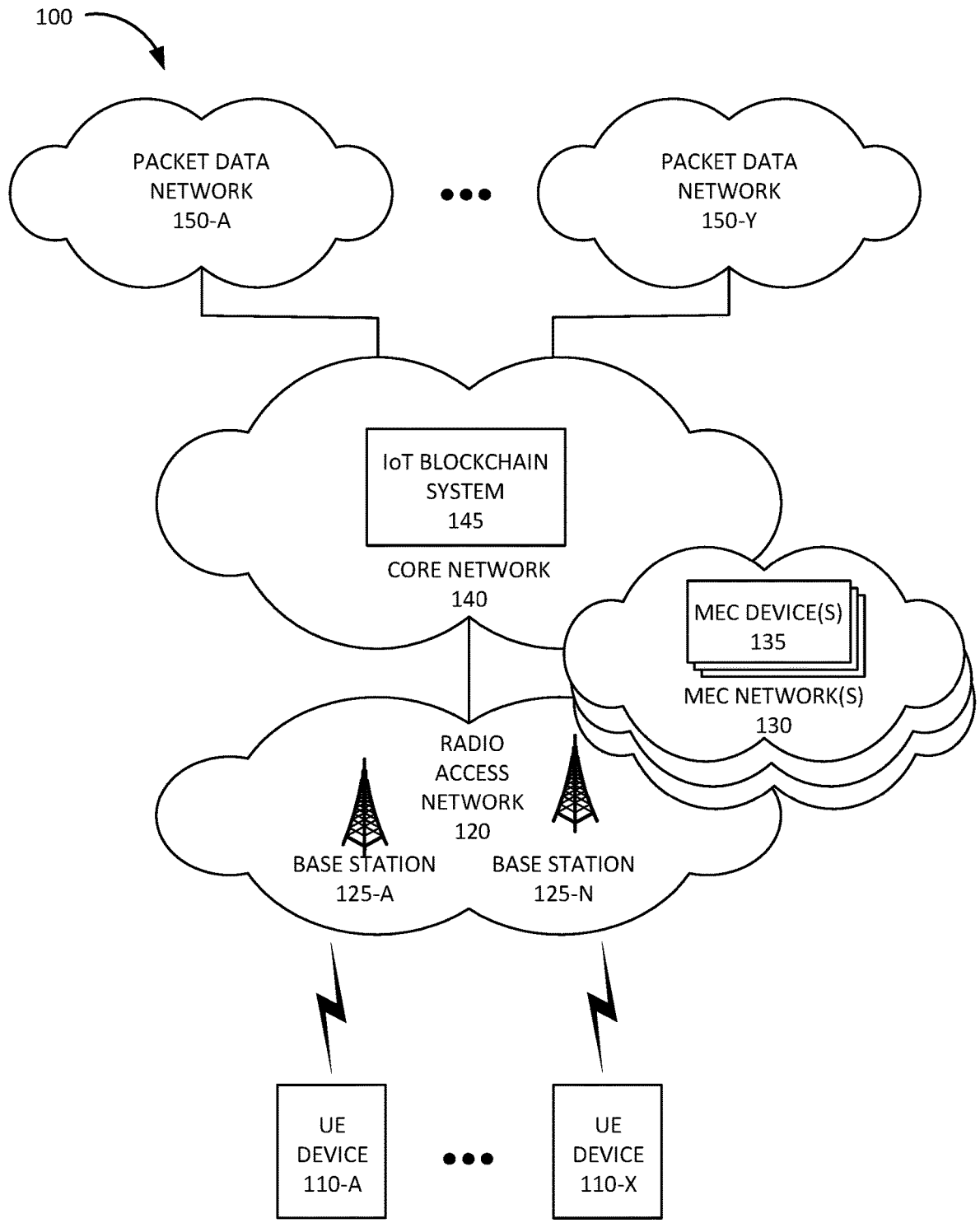
FIG. 1 illustrates an environment according to an implementation described herein.

The following detailed description refers to the accompanying drawings. The same reference numbers in different drawings identify the same or similar elements.

While wireless networks have traditionally been used to provide service for handheld mobile wireless communication devices, such as smart phones, employed by users, the number of Internet of Things (IoT) devices using wireless networks to communicate with each other continues to increase at a rapid pace. An IoT device may communicate with other devices without requiring explicit user interaction. IoT devices may be used in a wide variety of applications. For example, IoT devices may be used in utility meters, environmental sensors, parking meters and/or occupancy sensors, security sensors, smart lighting, traffic cameras, advertising displays, point-of-sale terminals, vending machines, remote diagnostics devices, power grid sensors and/or management devices, health monitoring devices, autonomous vehicles, unmanned aerial drones, and/or other types of devices.

Uses of IoT devices are envisioned to increase exponentially and may result in a large number of such devices being serviced by a wireless access network. Estimates indicate that the number of IoT devices within a wireless operator's network may increase to hundreds of millions of devices communicating with each other autonomously with little to no human intervention. Thus, a provider of wireless communication services may manage wireless access networks that include a large number of IoT devices. When a first IoT device seeks to communicate with a second IoT device, the second IoT device may need to authenticate the first IoT device to ensure the identity of the first IoT device and to ensure that the first IoT device is authorized to communicate with the second IoT device. Authenticating a large number of IoT devices with each other may tax the resources of a wireless network.

One technology that exhibits desirable properties for supporting authentication is a blockchain. A "blockchain," as the term is used herein, may correspond to a distributed ledger of data blocks linked using cryptographic hashes. Thus, in some embodiments, a data block may be linked to the previous data block using a hash of the contents of the previous block. Since changing the data in a previous data block would change the hash, the data stored in a blockchain cannot be changed without having to change the hashes of all subsequent data blocks, making, in this type of embodiment, the blockchain very resistant to data changes. Furthermore, the blockchain may be distributed across a set of multiple nodes, with each node including a copy of the blockchain. An addition to the blockchain may be proposed by a node and approved if a quorum of nodes in the set of nodes reaches consensus. Various consensus mechanisms may be used by a blockchain depending on the application. The immutability and distributed nature of the data stored in a blockchain, as well as requirement to reach consensus to add data to the blockchain, make a blockchain a desirable technology for processing authentication. However, because the blockchain nodes associated with a blockchain may need to exchange a large number of messages with each other in order to reach consensus, a traditional blockchain authentication process may experience an undesirably long latency. Such, a long latency may be undesirable for wireless IoT devices.

A wireless communication device, such as an IoT device, may be referred to as a user equipment (UE) device from the point of view of the wireless network. A UE device may connect wirelessly to the network via a base station. The base station includes a radio frequency (RF) transceiver and, together with other base stations, may form a radio access network (RAN). The RAN may interface with a core network that enables establishment of an Internet Protocol (IP) connection to other networks, such as the public Internet or a private IP network. When a UE device requests an application session with a server device located in an IP network, the UE device may need to establish an IP connection to the IP network via the core network. Since the server device may be distant to the UE device from a geographic perspective and/or from a network topological perspective, such a connection may traverse a large number of routing devices and/or gateway devices. Thus, the connection between the server device and the UE device may result in large latency values.

To reduce latency and/or other parameters associated with network performance, and to reduce the load of traffic in core networks and gateway devices and to provide more efficient services, a provider of communication services that manages a RAN may deploy a MEC network that includes one or more MEC devices. The MEC devices in the MEC network may provide application services, and/or other types of services, such as Domain Name System (DNS) lookup, to UE devices wirelessly connected to a particular base station. The MEC network may be located in geographic proximity to a base station as well close to the base station from a network topology perspective. For example, the MEC network may be closer to the base station than to other base stations and may be reached with fewer network device traversals ("hops") than traffic from other base stations or traffic destined to devices in other packet data networks, such as a cloud computing center located in a core network or private packet data network. When a UE device requests a service that is available via a MEC network, the UE device may be connected to a MEC device in the MEC network, rather than to an application server in the core network or an external packet data network (e.g., the Internet at large). Different MEC networks may service different sets of base stations. A set of MEC networks distributed in different locations may be referred to as a "distributed edge" or "distributed edge computing."

Implementations described herein relate to edge computing for IoT security with blockchain type authentication. Devices in a MEC network may include a set of blockchain nodes that maintain a blockchain that registers the identity of IoT devices in an IoT device group. The blockchain may store and distribute the identities and/or authorizations of particular IoT devices in the IoT device group and the IoT devices in the IoT device group may authenticate each other using the blockchain. Implementing the blockchain nodes in MEC devices improves latency and improves the capacity of a RAN by reducing the number of messages that need to be exchanged by wireless IoT devices to add data to a blockchain.

A MEC device in a MEC network may be configured to generate a blockchain node, for a blockchain associated with a group of IoT devices, and associate the blockchain node with an IoT device that seeks to communicate with other IoT devices in the group of IoT devices. The MEC device may then register an identity of the IoT device with the blockchain, distribute the identity of the IoT device to a set of blockchain nodes, in a group of MEC devices associated with the group of IoT devices, via the blockchain, and determine whether consensus has been reached by the blockchain to add the identity of the IoT device to the blockchain. If the consensus has been reached, the identity of the IoT device may be registered with the blockchain.

The consensus mechanism used by the blockchain to reach consensus may include one or more of a Proof-of-Authority consensus process, a Proof-of-Stake consensus process, a Proof-of-Elapsed-Time consensus process, a Paxos consensus process, a Phase King consensus process, a Practical Byzantine Fault Tolerance consensus process, a Federated Byzantine Agreement consensus process, and/or another type of consensus mechanism.

After the identity of the IoT device has been added to the blockchain, the IoT device may be authenticated when sending messages to other devices in the group of IoT devices using the blockchain node. For example, a first blockchain node in a first MEC device located in a first MEC network associated with a first base station, may receive a message from a first IoT device to a second IoT device; authenticate the first IoT device using a blockchain associated with the group of IoT devices; and send the message to a second blockchain node in a second MEC device located in a second MEC network associated with a second base station servicing the second IoT device, in response to authenticating the first IoT device using the blockchain associated with the group of IoT devices. The second blockchain node may then forward the message to the second IoT device, via the second base station, as an authenticated message. Thus, the second IoT device may receive the message without having to perform an independent authentication process to verify the identity of the first IoT device.

Authenticating the first IoT device using the blockchain may include determining that the identity of the first IoT device has been recorded in the blockchain. In some implementations, the identity of the first IoT device may include a public key associated with the first IoT device and the message sent by the first IoT device may be signed with the private key associated with the private key. Thus, the blockchain may act as a certificate authority for the public key for the first IoT device.

Some IoT devices may be attached to a base station that is not associated with a MEC network. In such situations, an IoT device may be associated with a blockchain node in a cloud center device accessible via a core network. The blockchain node in the cloud center device may function similarly to the other blockchain nodes associated with the blockchain and located in MEC devices. For example, after the IoT device is authenticated, a MEC device may receive a message from the IoT device via a blockchain node in the cloud center device, and forward the message to another IoT device associated with the blockchain as an authenticated message.

The MEC device may manage multiple blockchains and may include different blockchain nodes for different blockchains associated with different IoT device groups. As an example, different blockchains may be associated with different enterprises, businesses, organizations, customers of the provider, and/or other types of entities that own or manage a group of IoT devices. As another example, different blockchains may be associated with different categories of use for IoT devices, different applications used by a group of IoT devices, different communication services or quality of service requirements associated with a group of IoT devices, different network slices, etc. Furthermore, the MEC device may manage a default blockchain that may be used to store the identity of an IoT device if the IoT device does not belong to any other group of IoT devices that are associated with their own blockchain.

For example, the MEC device may receive a request to register an identity of an IoT device; determining that the IoT device is to be registered with a default blockchain; distribute the identity of the IoT device to a group of blockchain nodes associated with the default blockchain, via the default blockchain; and determine that consensus has been reached by the default blockchain to add the identity of the IoT device to the default blockchain. The IoT device may then be able to authenticate itself with other IoT devices in the default blockchain.

FIG. 1 is a diagram of an exemplary environment 100 in which the systems and/or methods, described herein, may be implemented. As shown in FIG. 1, environment 100 may include UE devices 110-A to 110-X (referred to herein individually as "UE device 110" and collectively as "UE devices 110"), a radio access network 120, MEC networks 130, a core network 140, and packet data networks 150-A to 150-N (referred to herein collectively as "packet data networks 150" and individually as "packet data network 150").

UE device 110 may include any device with wireless communication functionality. For example, UE device 110 may include an IoT device that communicates using machine-to-machine (M2M) communication, such as machine-type communication (MTC), and/or another type of M2M communication. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), an autonomous vehicle, an unmanned aerial drone, and/or another type of electronic device.

In other implementations, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

Radio access network 120 may enable UE devices 110 to connect to core network 140 for mobile telephone service, Short Message Service (SMS) message service, Multimedia Message Service (MMS) message service, Rich Communication Services (RCS) service, Internet access, MEC services, cloud computing, and/or other types of data services. Radio access network 120 may include base stations 125-A to 125-N (referred to herein collectively as "base stations 125" and individually as "base station 125"). Each base station 125 may include devices and/or components configured to enable wireless communication with UE devices 110 located in cells or sectors serviced by base station 125. For example, for each cell or sector serviced by the base station, the base station may include a radio frequency (RF) transceiver facing a particular direction. Base station 125 may include a Fourth Generation (4G) base station configured to communicate with UE devices 110 as an eNodeB that uses a 4G Long Term Evolution (LTE) air interface. Additionally, or alternatively, base station 125 may include a Fifth Generation (5G) base station configured to communicate with UE devices 110 as a gNodeB that uses a 5G New Radio (NR) air interface. A gNodeB may include one or more antenna arrays configured to send and receive wireless signals in the mm-wave frequency range.

Furthermore, radio access network 120 may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Each MEC network 130 may be associated with one or more base stations 125 and may provide MEC services for UE devices 110 attached to the one or more base stations 125. MEC network 130 may be in proximity to the one or more base stations 125 from a geographic and network topology perspective. As an example, MEC network 130 may be located on a same site as one of the one or more base stations 125. As another example, MEC network 130 may be geographically closer to the one or more base stations 125, and reachable via fewer network hops and/or fewer switches, than other base stations 125 and/or packet data networks 150. As yet another example, MEC network 130 may be reached without having to go through a gateway device, such as a 4G Packet Data Network Gateway (PGW) or a 5G User Plane Function (UPF).

MEC network 130 may interface with RAN 120 and/or with core network 140 via a MEC gateway device (not shown in FIG. 1). In some implementations, MEC network 130 may be connected to RAN 120 via a direct connection to base station 125. For example, in a 4G network, MEC network 130 may connect to an eNodeB via an S1 interface, or, in a 5G network, MEC network 130 may connect to a gNodeB via an N3 interface. In other implementations, MEC network 130 may include, or be included in, core network 140. As an example, in a 4G network, MEC network 130 may connect to a Serving Gateway (SGW) via an S5 interface, or, in a 5G network, MEC network 130 may connect to a Session Management Function (SMF) via an N4 interface. MEC network 130 may support UE device 110 mobility and handover application sessions from a first MEC network 130 to a second MEC network 130 when UE device 110 experiences a handover from a first base station 125 to a second base station 125.

MEC network 130 may include one or more MEC devices 135. MEC network 130 may support device registration, discovery, and/or management of MEC devices 135 in MEC network 130. MEC device 135 may include particular hardware capabilities, such as particular CPUs, GPUs, hardware accelerators, and/or other types of hardware capabilities. Furthermore, MEC device 135 may include particular software capabilities, such as a particular operating system, virtual machine, virtual container, application, and/or another type of software capability.

MEC device 135 may connect to one or more base stations 125 in RAN 120 and provide one or more MEC services to UE devices 110 connected to the one or more base stations 125. As an example, a MEC service may include a service associated with a particular application, such as a content deliver system that provides streaming video on demand, an audio streaming service, a real-time online game, a virtual reality application, a medical or health monitoring application, and/or another type of application with a low latency requirement. As another example, a MEC service may include a cloud computing service, such as cache storage, use of artificial intelligence (AI) accelerators for machine learning computations, use of GPUs for processing of graphic information and/or other types of parallel processing, and/or other types of cloud computing services. As yet another example, a MEC service may include a network service, such as authentication, for example via a certificate authority for a Public Key Infrastructure (PKI) system, a local DNS service, implementation of a virtual network function (VNF), and/or another type of network service. As yet another example, a MEC service may include control of IoT devices, such as hosting an application server for autonomous vehicles, a security system, a manufacturing and/or robotics system, and/or another type of IoT system. Consistent with implementations described herein, MEC device 135 may include one or more blockchain nodes associated with a blockchain. Furthermore, MEC device 135 may enable communication between IoT devices associated with the blockchain.

Core network 140 may manage communication sessions for UE devices 110. For example, core network 140 may establish an IP connection between UE device 110 and a packet data network 150. Furthermore, core network 140 may enable UE device 110 to communicate with an application server, and/or another type of device, located in a packet data network 150 using a communication method that does not require the establishment of an IP connection between UE device 110 and packet data network 150, such as, for example, Data over Non-Access Stratum (DoNAS).

In some implementations, core network 140 may include an LTE core network (e.g., an evolved packet core (EPC) network). In other implementations, core network 140 may include a Code Division Multiple Access (CDMA) core network. For example, the CDMA access network may include a CDMA enhanced High Rate Packet Data (eHRPD) network (which may provide access to an LTE core network). An EPC network may include devices that implement network functions that include a Mobility Management Entity (MME) that implements control plane processing, authentication, mobility management, tracking and paging, and activating and deactivating bearers; an SGW that provides an access point to and from UE devices, acts as a local anchor point during handovers, and directs gateway to a PGW; a PGW that functions as a gateway to a particular packet data network 150; a Policy and Charging Rules Function (PCRF) that implements policy and charging rules functions, such as establishment of Quality of Service (QoS) requirements, setting allowed bandwidth and/or data throughput limits for particular bearers, and/or other policies; and a Home Subscriber Server (HSS) that stores subscription information for UE devices, including subscription profiles that include authentication and access authorization information, group device memberships, subscription privileges, and/or other types of subscription information.

In other implementations, core network 140 may include a 5G core network. A 5G core network may include devices that implement network functions that include an Access and Mobility Function (AMF) to perform registration management, connection management, reachability management, mobility management, and/or lawful intercepts; an SMF to perform session management, session modification, session release, IP allocation and management, Dynamic Host Configuration Protocol (DHCP) functions, and selection and control of a UPF; a UPF to serve as a gateway to packet data network 150, act as an anchor point, perform packet inspection, routing, and forwarding, perform QoS handling in the user plane, uplink traffic verification, transport level packet marking, downlink packet buffering, and/or other type of user plane functions; an Application Function (AF) to provide services associated with a particular application; a Unified Data Management (UDM) to manage subscription information, handle user identification and authentication, and perform access authorization; a Policy Control Function (PCF) to support policies to control network behavior, provide policy rules to control plane functions, access subscription information relevant to policy decisions, and perform policy decisions; a Charging Function (CHF) to perform charging and billing functions; a Network Repository Function (NRF) to support service discovery, registration of network function instances, and maintain profiles of available network function instances; a Network Exposure Function (NEF) to expose capabilities and events to other network functions, including third party network functions; a Network Slice Selection Function (NSSF) to select a network slice instance to serve a particular UE device 110; and/or other types of network functions.

Furthermore, a 5G core network may implement network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, may be configured to implement a different set of requirements and/or priorities, and/or may be associated with a particular QoS class, type of service, and/or particular enterprise customer associated with a set of UE devices.

The components of core network 140 may be implemented as dedicated hardware components and/or as virtualized network functions (VNFs) implemented on top of a common shared physical infrastructure using Software Defined Networking (SDN). For example, an SDN controller may implement one or more of the components of core network 140 using an adapter implementing a VNF virtual machine, a Cloud-Native Network Function (CNF) container, an event driven serverless architecture interface, and/or another type of SDN architecture. The common shared physical infrastructure may be implemented using one or more devices 300 described below with reference to FIG. 3 in a cloud computing center associated with core network 130. Additionally, or alternatively, some, or all, of the common shared physical infrastructure may be implemented using one or more devices 300 included in MEC device 135.

Consistent with implementations described herein, core network 140 may include IoT blockchain system 145. IoT blockchain system 145 may include one or more computer devices, such as server devices, configured to manage blockchain nodes for UE devices 110 that are attached to base stations 125 that are not associated with a MEC network 130.

Packet data networks 150-A to 150-N may each include a packet data network. A particular packet data network 150 may be associated with an Access Point Name (APN) and UE device 110 may request a connection to the particular packet data network 150 using the APN. Packet data network 150 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks).

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
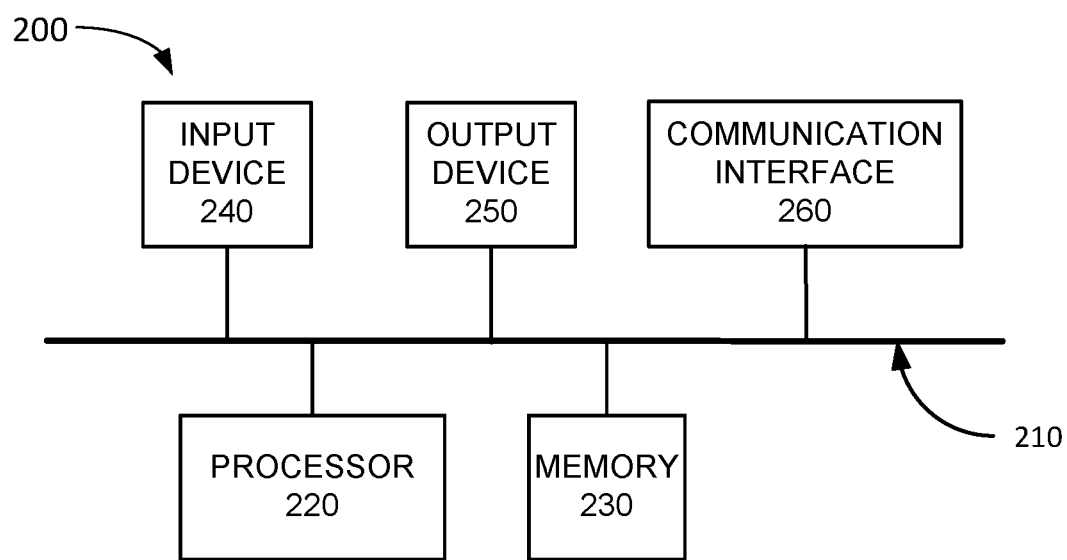
FIG. 2 illustrates exemplary components of a device that may be included in the environment of FIG. 1 according to an implementation described herein.

FIG. 2 is a diagram illustrating example components of a device 200 according to an implementation described herein. UE device 110, base station 125, MEC device 135, and/or IoT blockchain system 145 may each include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to authentication of IoT devices using a blockchain. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
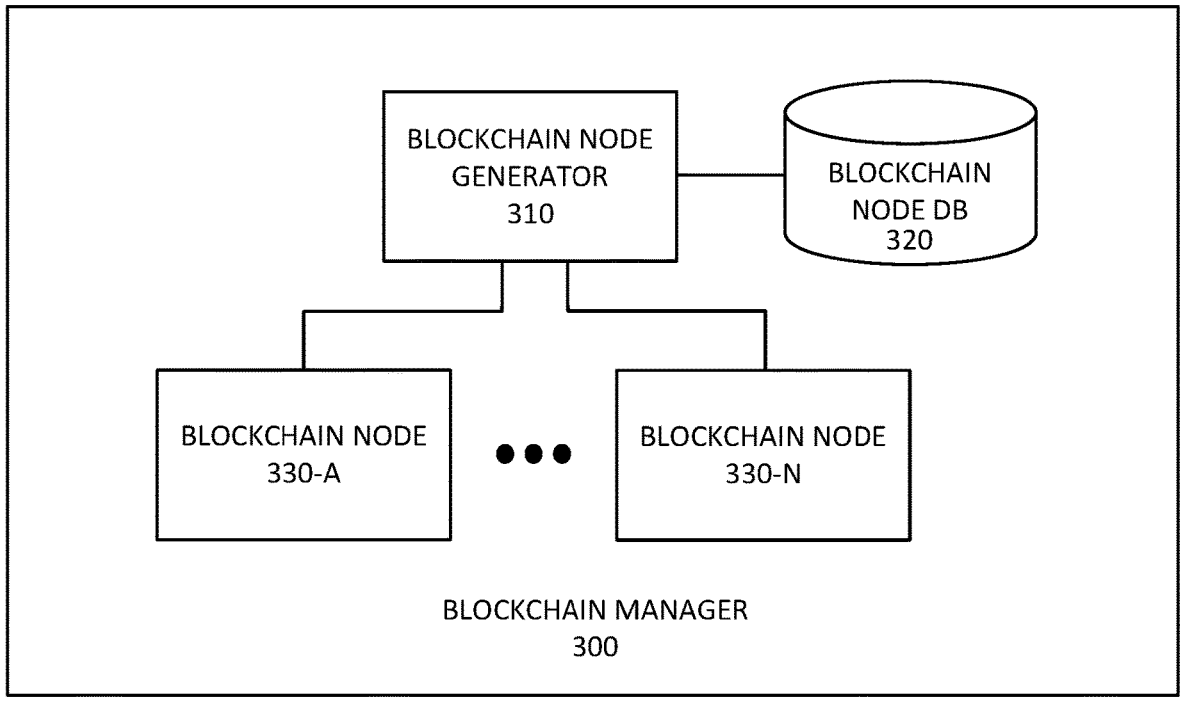
FIG. 3 illustrates exemplary components of the Multi-access Edge Computing (MEC) device of FIG. 1 according to an implementation described herein.

FIG. 3 is a diagram illustrating exemplary components of MEC device 135. The components of MEC device 135 may be implemented, for example, via processor 220 executing instructions from memory 230. Alternatively, some or all of the components of MEC device 135 may be implemented via hard-wired circuitry. As shown in FIG. 3, MEC device 135 may include a blockchain manager 300.

Blockchain manager 300 may manage blockchain nodes included in MEC device 135. Blockchain manager 300 may include a blockchain node generator 310, a blockchain node database (DB) 320, and blockchain nodes 330-A to 330-N (referred to herein collectively as "blockchain nodes 330" and individually as "blockchain node 330").

Blockchain node generator 310 may generate blockchain nodes 330 for UE devices 110. For example, blockchain node generator 310 may generate a new blockchain node 330 in response to receiving a request from UE device 110 to communicate with other UE devices 110 and/or to join a particular blockchain. Additionally, or alternatively, blockchain node generator 310 may generate a new blockchain node 330 based on an instruction received from an administration device. For example, when a managing entity deploys a new UE device 110, the managing entity may use the administration device to add the new UE device 110 to an existing blockchain associated with the managing entity.

In some implementations, the blockchain may be permissionless and new blockchain nodes 330 may automatically join the set of blockchain nodes 330 associated with the blockchain 330 without approval (i.e., without the set of blockchain nodes 330 having to reach consensus to add the new blockchain node 330 to the set). In other implementations, the blockchain may be permissioned and new blockchain nodes 330 may need to be approved by existing blockchain nodes 330 to join the blockchain. For example, the existing blockchain nodes 330 may need to reach consensus, using a particular consensus mechanism and a particular quorum of nodes, to add the new blockchain node 330 to the set of blockchain nodes 330 associated with the blockchain.

Blockchain node DB 320 may store information associated with blockchain nodes 330. For example, for a particular blockchain node, blockchain node 320 may store information identifying a particular UE device 110 associated with the particular blockchain node, information identifying the blockchain associated with the particular blockchain node, and/or other types of information associated with the particular blockchain node. Each blockchain node 330 may be associated with a particular blockchain and a particular UE device 110. Exemplary components that may be included in blockchain node 330 are described below with reference to FIG. 4.

Although FIG. 3 shows exemplary components of MEC device 135, in other implementations, MEC device 135 may include fewer components, different components, differently arranged components, or additional components than depicted in FIG. 3. Additionally, or alternatively, one or more components of MEC device 135 may perform functions described as being performed by one or more other components of MEC device 135.

Figure 4:
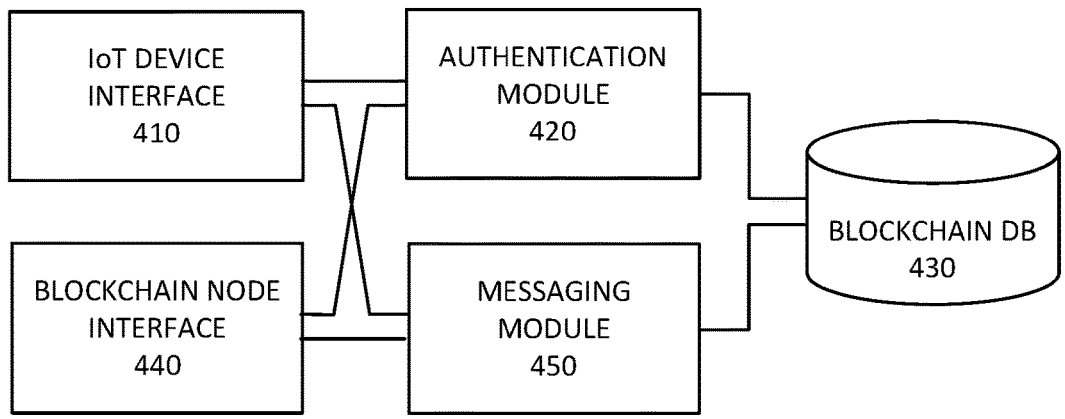
FIG. 4 illustrates exemplary components of the blockchain node of FIG. 3 according to an implementation described herein.

FIG. 4 is a diagram illustrating exemplary components of blockchain node 330. As shown in FIG. 4, blockchain node 330 may include an IoT device interface 410, an authentication module 420, a blockchain DB 430, a blockchain node interface 440, and a messaging module 450.

IoT device interface 410 may be configured to communicate with UE devices 110. For example, IoT device interface 410 may receive messages from UE device 110 and/or may send messages to UE device 110. Authentication module 420 may authenticate a UE device 110 by adding an identity of UE device 110 to the blockchain. For example, authentication module 420 may propose to add a data block with the identity of UE device 110 to the blockchain and send the proposal to the other blockchain nodes 330 associated with the blockchain. If consensus is reached, the proposed data block is added to the blockchain.

The consensus mechanism used by authentication module 420 to reach consensus may include one or more of a Proof-of-Authority consensus process, a Proof-of-Stake consensus process, a Proof-of-Elapsed-Time consensus process, a Paxos consensus process, a Phase King consensus process, a Practical Byzantine Fault Tolerance consensus process, a Federated Byzantine Agreement consensus process, and/or another type of consensus mechanism.

Furthermore, authentication module 420 may authenticate a message received from another UE device 110 by checking whether the identity of the other UE device 110 is recorded in the blockchain. For example, authentication module 420 may retrieve a public key associated with UE device 110 from the blockchain and use the public key to verify that a message was signed with the private key corresponding to the public key.

Blockchain DB 430 may store the blockchain associated with blockchain node 330. Exemplary information that may be stored in blockchain DB 430 is described below with reference to FIG. 5. Blockchain node interface 440 may be configured to communicate with other blockchain nodes 330 associated with the blockchain. For example, blockchain node interface 440 may send a proposal to the other blockchain nodes 330 to add a data block to the blockchain, may receive a proposal to add a data block from another blockchain node 330, may respond to a proposal with an accept or reject message in an attempt to generate consensus about whether a proposed data block should be added to the blockchain, and/or may send or receive other types of messages to or from other blockchain nodes 330.

Messaging module 450 may forward a message from an originating UE device 110 to a destination UE device 110. As an example, messaging module 450 may receive a message from an originating UE device 110, receive an indication from authentication module 420 that the message has been authentication using the blockchain, determine a blockchain node 330 associated with a destination UE device 110 based on information stored in the blockchain, and forward the message to the determined blockchain node 330. As another example messaging module 450 may receive a message from an originating UE device 110 via another blockchain node 330 associated with the originating UE device 110, receive an indication from authentication module 420 that the message has been authentication using the blockchain, and forward the message to the destination UE device 110 as an authenticated message.

Whiles in some implementations, information relating to particular messages may not be stored in the blockchain, in other implementations, information relating to messages sent and received via blockchain node 330 may be added to the blockchain. For example, the blockchain nodes 330 may need to reach consensus to approve that metadata associated with a message is added to the blockchain. The metadata may include information identifying an originating UE device 110, a destination UE device 110, a timestamp, information identifying the type of message and/or the type of data included in the message, and/or other types of metadata. Once consensus is reached and the information relating to the message is recorded in the blockchain, the message may be forward to the destination UE device 110.

Although FIG. 4 shows exemplary components of blockchain node 330, in other implementations, blockchain node 330 may include fewer components, different components, differently arranged components, or additional components than depicted in FIG. 4. Additionally, or alternatively, one or more components of blockchain node 330 may perform functions described as being performed by one or more other components of blockchain node 330.

Figure 5:
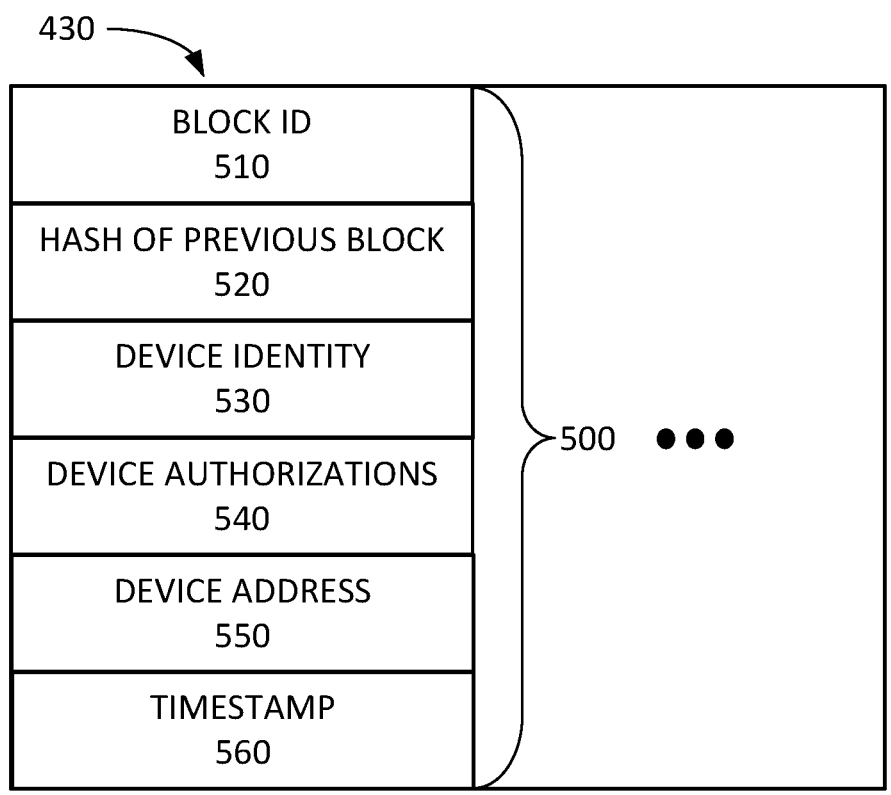
FIG. 5 illustrates exemplary components of the blockchain database of FIG. 4 according to an implementation described herein.

FIG. 5 is a diagram illustrating exemplary information stored in blockchain DB 430 according to an implementation described herein. As shown in FIG. 5, blockchain DB 430 may include one or more block records 500. Each block record 500 may store information relating to a particular data block of the blockchain associated with blockchain DB 430. Each block record 500 may include a block identifier (ID) field 510, a hash of a previous block field 520, a device identity field 530, a device authorizations field 540, a device address field 550, and a timestamp field 560.

Block ID field 510 may store an ID associated with the particular data block. Hash of previous block field 520 may store a hash of the data stored in the previous data block. The hash may be used to check the integrity of the blockchain. For example, if the data stored in any of the previous blocks is changed, the hashes of all subsequent blocks will change and will not match the stored hashes, indicating that the data in the blockchain has changed.

Device identity field 530 may store an identity associated with a particular UE device 110. For example, device identity field 530 may store a public key associated with the particular UE device 110. Additionally, or alternatively, device identity field 530 may store other identity information, such as an International Mobile Equipment Identity (IMEI), a Mobile Directory Number (MDN), an International Mobile Subscriber Identity (IMSI), a Mobile Station International Subscriber Directory Number (MSISDN), a Globally Unique Temporary Identity (GUTI), a Cell Radio Network Temporary Identity (CRTNI), an IP address, a Media Access Control (MAC) address, and/or another type of identifier associated with UE device 110.

Device authorizations field 540 may store one or more authorizations associated with the particular UE device 110, such as, for example, the type of messages and/or data the particular UE device 110 is authorized to send or receive, to which other UE devices 110 the particular UE device 110 is authorized to send messages or from which other UE devices 110 the particular UE device is authorized to receive messages, and/or other types of authorization information.

Device address field 550 may store an address associated with the particular UE device 110. For example, device address field 550 may store routing information for sending messages to the particular UE device 110, such as via which blockchain node 330 the particular UE device 110 is reachable, and/or any type of address associated with the particular UE device 110 used by RAN 120 to deliver messages to the particular UE device 110. Timestamp field 560 may store a timestamp for the particular data black indicating when the particular data block was added to the blockchain. The timestamp may be incorporated into the hash stored in the next data block.

Although FIG. 5 shows exemplary components of blockchain DB 430, in other implementations, blockchain DB 430 may include fewer components, different components, additional components, or differently arranged components than depicted in FIG. 5.

Figure 6:
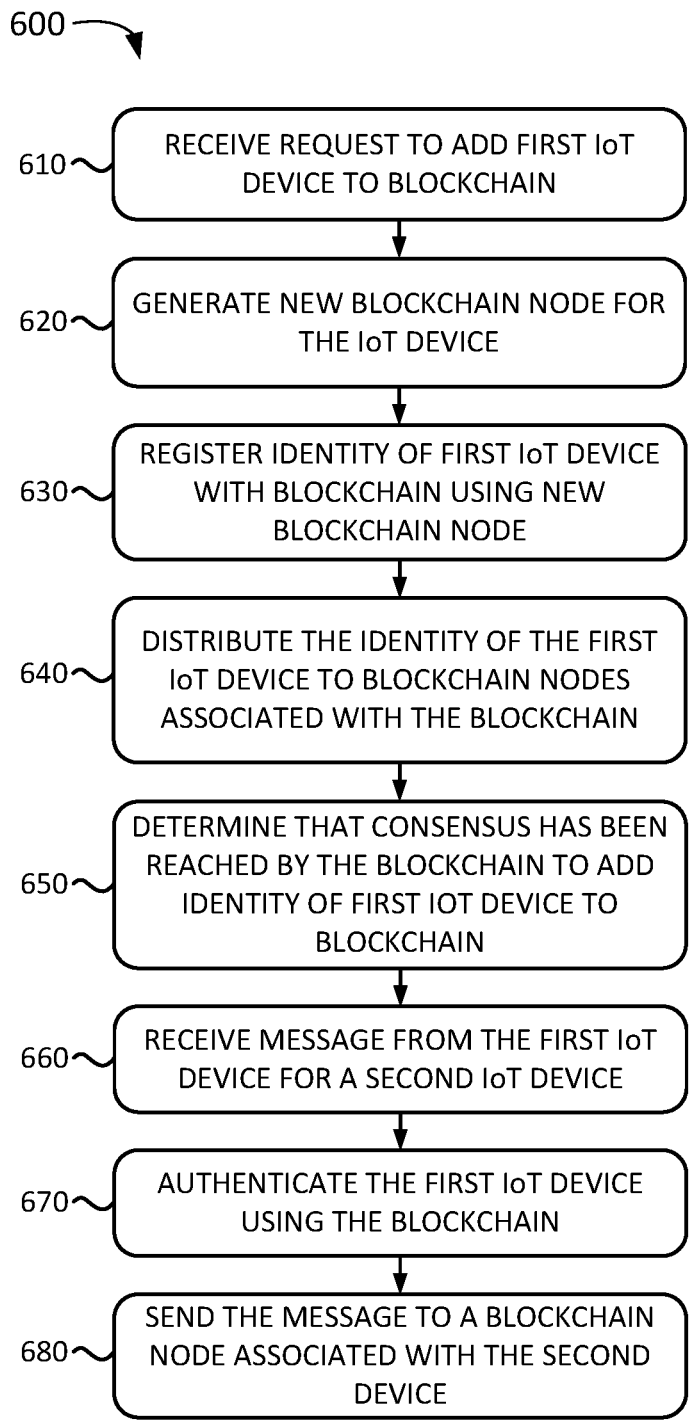
FIG. 6 illustrates a flowchart of authenticating an Internet of Things device using a blockchain according to an implementation described herein.

FIG. 6 illustrates a flowchart of a process 600 for authenticating an Internet of Things device using a blockchain according to an implementation described herein. In some implementations, process 600 of FIG. 6 may be performed by MEC device 135. In other implementations, some or all of process 600 may be performed by another device or a group of devices separate from MEC device 135. For example, process 600 may be performed by IoT blockchain system 145 if UE device 110 is attached to base station 125 that is not associated with MEC network 130.

As shown in FIG. 6, process 600 may include receiving a request to add a first IoT device to a blockchain (block 610) and generating a new blockchain node for the IoT device (block 620). For example, MEC device 135 may generate a new blockchain node 330 in response to receiving a request from UE device 110 to communicate with other UE devices 110 and/or to join a particular blockchain and/or may generate a new blockchain node 330 based on an instruction received from and administration device. If the blockchain is permissionless, the new blockchain node 330 may automatically join the set of blockchain nodes 330 associated with the blockchain. If the blockchain is permissioned, the set of blockchain nodes 330 may need to vote and reach consensus to allow the new blockchain node 330 to join the set.

Process 600 may further include registering an identity of the first IoT device with the blockchain using the new blockchain node 330 (block 630), distributing the identity of the first IoT device to blockchain nodes 330 associated with the blockchain (block 640), and determining that consensus has been reached by the blockchain to add the identity of the first IoT device to the blockchain (block 650). For example, MEC device 135 may propose to add a data block with the identity of UE device 110 to the blockchain and send the proposal to the other blockchain nodes 330 associated with the blockchain. If consensus is reached, the proposed data block is added to the blockchain, resulting in the identity of UE device 110 being added to the blockchain.

Process 600 may further include receiving a message from the first IoT device for a second IoT device (block 660), authenticating the first IoT device using the blockchain (block 670), and sending the message to a blockchain node associated with the second IoT device (block 680). For example, MEC device 135 may receive a message from UE device 110, authenticate the message using the blockchain, determine a blockchain node 330 associated with a destination UE device 110 based on information stored in the blockchain, and forward the message to the determined blockchain node 330. The message may be authenticated by determining that the identity of UE device 110 has been stored in the blockchain. For example, MEC device 135 may retrieve a public key associated with UE device 110 from the blockchain and use the public key to verify that a message was signed with the private key corresponding to the public key.

Figure 7:
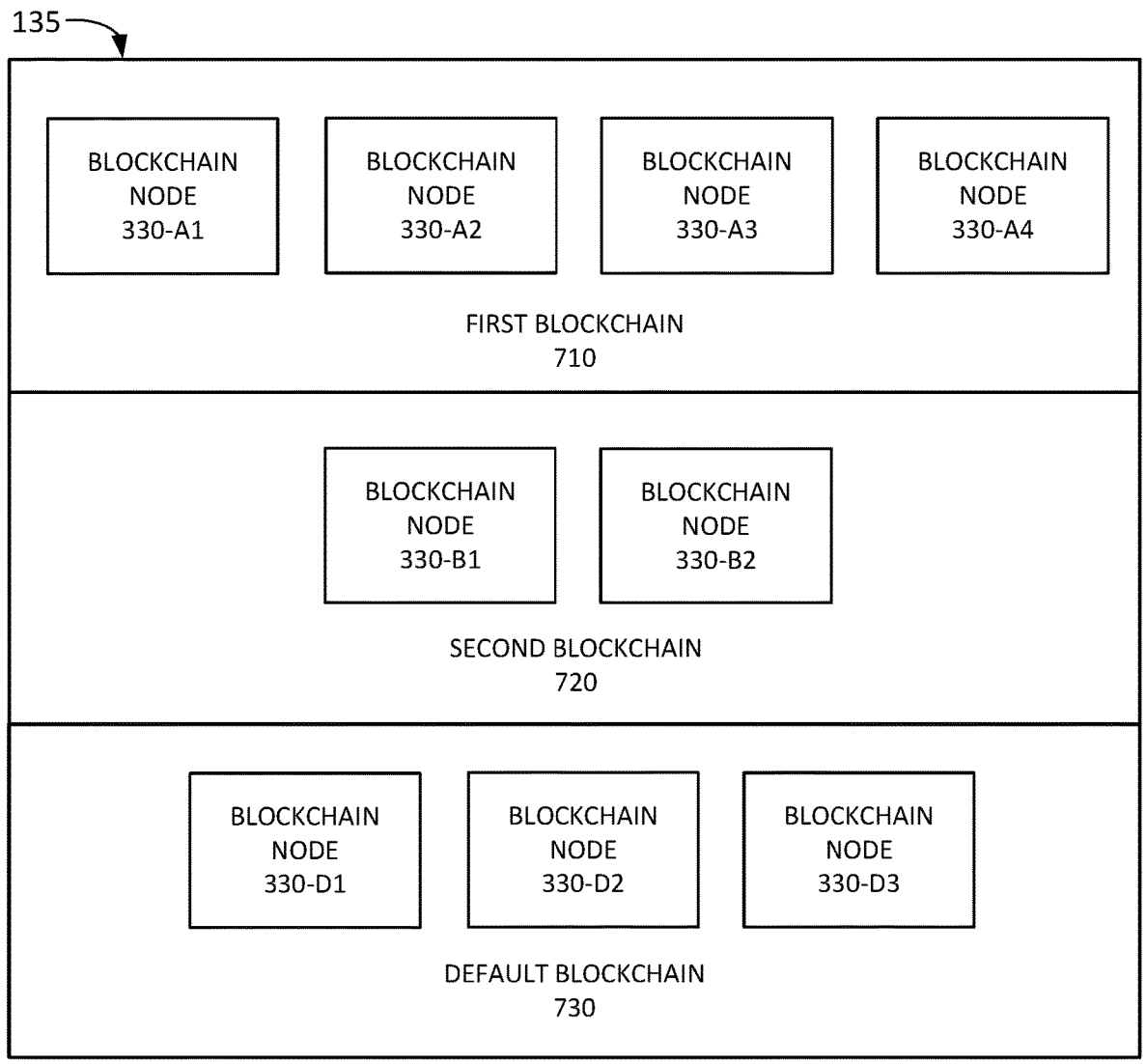
FIG. 7 illustrates an exemplary set of blockchain nodes in a MEC device according to an implementation described herein.

FIG. 7 illustrates an exemplary set of blockchain nodes in MEC device 135 according to an implementation described herein. As shown in FIG. 7, MEC device 135 may include blockchain nodes associated with a first blockchain 710, blockchain nodes associated with a second blockchain 720, and blockchain nodes associated with a default blockchain 730. Assume four UE devices 110 attached to base station 125 associated with MEC device 135 are in the group of IoT devices associated with first blockchain 710. Therefore, MEC device 135 may generate a blockchain node for each of the four UE devices 110: a blockchain node 330-A1, a blockchain node 330-A2, a blockchain node 330-A3, and a blockchain node 330-A4.

Furthermore, assume two UE devices attached to base station 125 associated with MEC device 135 are in the group of IoT devices associated with second blockchain 720. Therefore, MEC device 135 may generate a blockchain node for each of the two UE devices 110: a blockchain node 330-B1 and a blockchain node 220-B2. Moreover, assume three UE devices 110 attached to base station 125 are not associated with predefined a group of IoT devices, but nevertheless select to communicate with each other. MEC device 135 may generate a blockchain node for each of the three UE devices 110: a blockchain node 330-D1, a blockchain node 330-D2, and a blockchain node 220-D3.

Figure 8A:
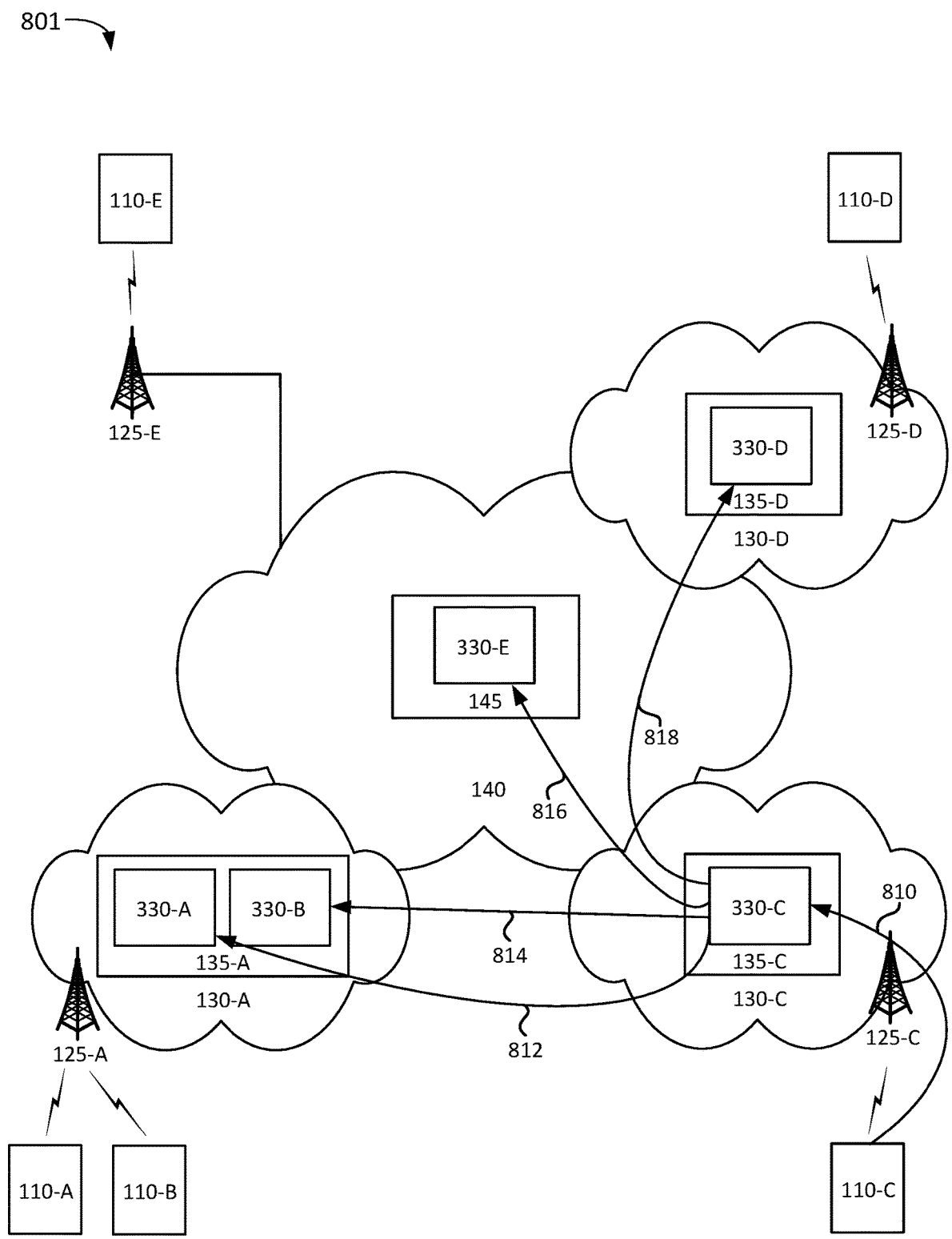
FIGS. 8A-8C illustrate an exemplary signal flow according to an implementation described herein.
Figure 8B:
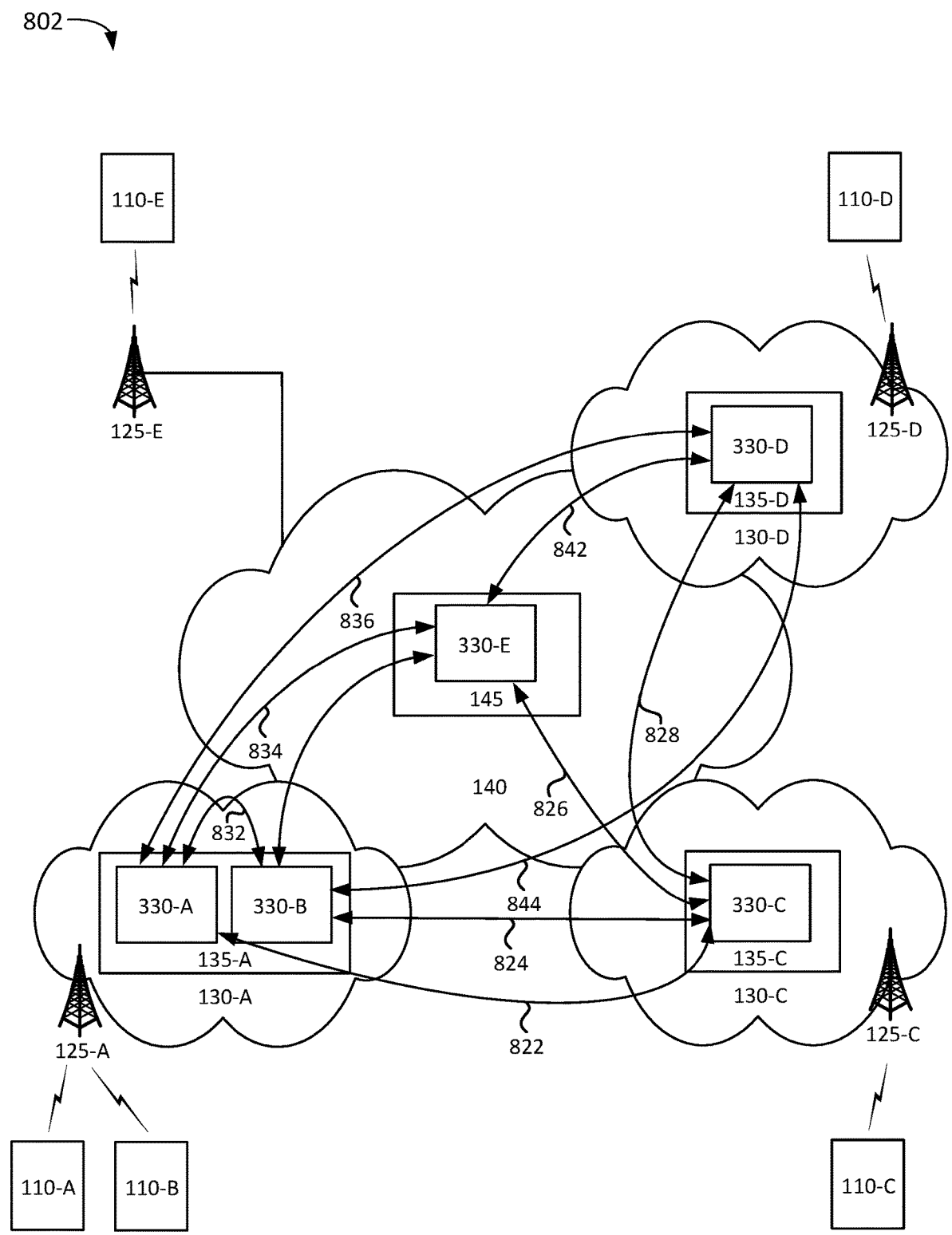
Figure 8C:
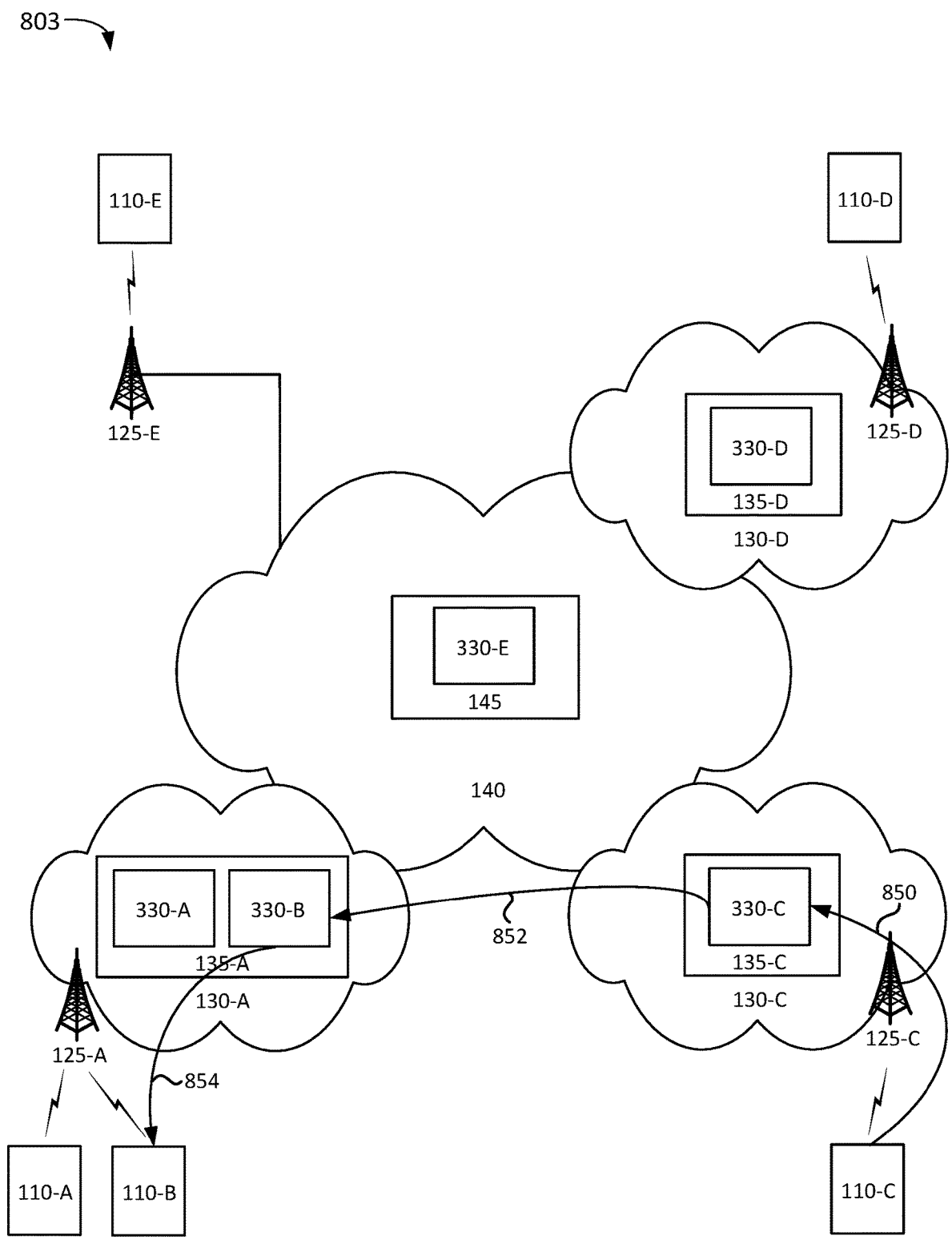

FIGS. 8A-8C illustrate exemplary signal flows according to implementations described herein. As shown in FIG. 8A, signal flow 801 may include a set of signals exchanged by blockchain nodes 330 associated with a group of IoT devices. For example, assume UE devices 110-A, 110-B, 110-C, 110-D, and 110-E are owned or managed by an entity that selects to enable UE devices 110-A, 110-B, 110-C, 110-D, and 110-E to authenticate each other using a blockchain.

Assume UE devices 110-A and 110-B are attached to base station 125-A, UE device 110-C is attached to base station 125-C, UE device 110-D is attached to base station 125-D, and UE device 110-E is attached to base station 125-E. Furthermore, assume that base station 125-A is associated with MEC network 130-A, base station 125-C is associated with MEC network 130-C, base station 125-D is associated with MEC network 130-D, and that base station 125-E is not associated with a MEC network 130. Now assume UE devices 110-A, 110-B, 110-D, and 110-E have registered their identities with the blockchain, but UE device 110-C has not. MEC device 135-A may generate a blockchain node 330-A associated with UE device 110-A and a blockchain node 330-B associated with UE device 110-B, and MEC device 135-D may generate a blockchain node 330-D associated with UE device 110-D. Furthermore, because base station 125-E is not associated with a MEC network 130, blockchain processes associated with UE device 110-E may fallback to the cloud center that includes IoT blockchain system 145 and IoT blockchain system 145 generates blockchain node 330-E.

Now assume UE device 110-C seeks to register with the blockchain. UE device 110-C may send a request to MEC device 135-C via base station 125-C to add the identity of UE device 110-C to the blockchain (signal 810). In response, MEC device 135-C may generate blockchain node 330-C and blockchain node 330-C may subsequently request to join the set of blockchain nodes associated with the blockchain and, after joining, may propose to add a block to the blockchain with the identity of UE device 110-C. MEC device 135-C may send the proposal to add the block to the other blockchain nodes associated with the blockchain: blockchain nodes 330-A, 330-B, 330-D, and 330-E (signals 812, 814, 816, and 818).

FIG. 8B illustrates a subsequent signal flow 802 following signal flow 801 of FIG. 8A. As shown in FIG. 8B, signal flow 802 includes blockchain nodes 330-A, 330-B, 330-C, 330-D, and 330-E exchanging messages with each other in an attempt to reach consensus as to whether to accept blockchain node 330-C in the membership of blockchain nodes associated with the blockchain, and then whether to add the proposed block with the identity of UE device 110-C to the blockchain (signals 822, 824, 826, 828, 832, 834, 836, 842, and 844).

The exact number and nature of the exchanged messages may depend on the particular consensus mechanism that is implemented by the blockchain. Furthermore, the chosen consensus mechanisms for adding a new blockchain node 330 to the set of blockchain nodes 330 for the blockchain may differ from the mechanism for adding new data blocks to the blockchain. For example, if the blockchain is permissionless, then the new blockchain node 330 may be added automatically to the set of blockchain nodes 330 without the set of blockchain nodes 330 having to reach consensus. If consensus is reached to add the block with the identity of UE device 110-C to the blockchain, UE device 110-C may be authenticated and may send messages to UE devices 110-A, 110-B, 110-D, and 110-E.

FIG. 8C illustrates a subsequent signal flow 803 following signal flow 802 of FIG. 8B. As shown in FIG. 8C, signal flow 803 includes UE device 110-C sending a message to UE device 110-B via base station 125-C using blockchain node 330-C (signal 850). The message may be signed with the private key of UE device 110-C. Blockchain node 330-C may determine the address of UE device 110-B based on information stored in the blockchain and determine that UE device 110-B is reachable via blockchain node 330-B in MEC device 135-A. In response, blockchain node 330-C may forward the message from UE device 110-A to blockchain 330-B in MEC device 135-A (signal 852).

Blockchain node 330-B may receive the message from blockchain 330-C and may authenticate the message by retrieving the public key associated with UE device 110-C from the blockchain and verifying that the message was signed with the private key corresponding to the retrieved public key. Furthermore, blockchain node 330-B may check the authorizations associated with UE device 110-A stored in the blockchain to ensure that UE device 110-A is authorized to send the type of message that is being sent to UE device 110-B. Blockchain node 330-B may then determine the address of UE device 110-B from the blockchain and send the message to UE device 110-B via base station 125-A as an authenticated message (signal 854). Thus, UE device 110-B my receive the message from UE device 110-C as an authenticated message without itself having to authenticate UE device 110-A.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 6, and a series of signals with respect to FIGS. 8A-8C, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, by a first blockchain node in a first multi-access edge computing (MEC) device and via a first base station, a message from a first Internet of Things (IoT) device to a second IoT device, wherein the first MEC device is located in a first MEC network associated with the first base station;
   authenticating, by the first blockchain node in the first MEC device, the first IoT device using a blockchain associated with a plurality of IoT devices;
   identifying, by the first blockchain node in the first MEC device, a second blockchain node associated with the second IoT device based on information stored in the blockchain; and
   sending, by the first blockchain node in the first MEC device, the message to the identified second blockchain node in a second MEC device, wherein the second MEC device is located in a second MEC network associated with a second base station servicing the second IoT device, in response to authenticating the first IoT device using the blockchain associated with the plurality of IoT devices.

2. The method of claim 1, further comprising:
   registering an identity of the first IoT device with the blockchain;
   distributing the identity of the first IoT device to a plurality of blockchain nodes, in a plurality of MEC devices associated with the plurality of IoT devices, via the blockchain;
   determining that consensus has been reached by the blockchain to add the identity of the first IoT device to the blockchain; and
   adding the identity of the first IoT device to the blockchain.

3. The method of claim 2, wherein a consensus mechanism used by the blockchain to reach consensus includes at least one of:
   a Proof-of-Authority consensus process,
   a Proof-of-Stake consensus process,
   a Proof-of-Elapsed-Time consensus process,
   a Paxos consensus process,
   a Phase King consensus process,
   a Practical Byzantine Fault Tolerance consensus process, or
   a Federated Byzantine Agreement consensus process.

4. The method of claim 1, wherein the message is signed with a private key associated with the first IoT device, wherein the blockchain includes a public key associated with the private key, and wherein the blockchain acts as a certificate authority for the public key for the first IoT device.

5. The method of claim 1, wherein authenticating the first IoT device using the blockchain associated with the plurality of IoT devices includes:
   determining that the identity of the first IoT device has been recorded in the blockchain.

6. The method of claim 1, further comprising:
   receiving another message, wherein the other message is received from the second IoT device via the second blockchain node; and
   forwarding the other message to the first IoT device as an authenticated message.

7. The method of claim 1, further comprising:
   receiving another message, wherein the other message is received from a third IoT device via a third blockchain node associated with the blockchain, wherein the third blockchain node is located in a cloud center; and
   forwarding the other message to the first IoT device as an authenticated message.

8. The method of claim 1, further comprising:
   receiving, by a third blockchain node in the first MEC device and via the first base station, another message from a third IoT device to a fourth IoT device;
   authenticating, by the third blockchain node, the third IoT device using another blockchain associated with another plurality of IoT devices; and
   sending, by the third blockchain node, the message to the fourth IoT device, in response to authentication the third IoT device using the other blockchain associated with the other plurality of IoT devices.

9. The method of claim 1, further comprising:
   receiving a request to register an identity of a third IoT device;
   determining that the third IoT device is to be registered with a default blockchain;
   distributing the identity of the third IoT device to another plurality of blockchain nodes, wherein the other plurality of blockchain nodes is associated with the default blockchain, via the default blockchain;
   determining that consensus has been reached by the default blockchain to add the identity of the third IoT device to the default blockchain; and
   adding the identity of the third IoT device to the default blockchain.

10. A device comprising:
   a memory storing instructions; and
   a processor configured to execute the instructions to:
      receive, by a first blockchain node and via a first base station, a message from a first Internet of Things (IoT) device to a second IoT device, wherein the device corresponds to a first multi-access edge computing (MEC) device located in a first MEC network associated with the first base station;

authenticate, by the first blockchain node, the first IoT device using a blockchain associated with a plurality of IoT devices;

identify, by the first blockchain node, a second blockchain node associated with the second IoT device based on information stored in the blockchain; and send, by the first blockchain node, the message to the identified second blockchain node in a second MEC device, wherein the second MEC device is located in a second MEC network associated with a second base station servicing the second IoT device, in response to authenticating the first IoT device using the blockchain associated with the plurality of IoT devices.

11. The device of claim 10, wherein the processor is further configured to:

register an identity of the first IoT device with the blockchain;

distribute the identity of the first IoT device to a plurality of blockchain nodes, in a plurality of MEC devices associated with the plurality of IoT devices, via the blockchain;

determine that consensus has been reached by the blockchain to add the identity of the first IoT device to the blockchain; and add the identity of the first IoT device to the blockchain.

12. The device of claim 11, wherein a consensus mechanism used by the blockchain to reach consensus includes at least one of:

a Proof-of-Authority consensus process, a Proof-of-Stake consensus process, a Proof-of-Elapsed-Time consensus process, a Paxos consensus process, a Phase King consensus process, a Practical Byzantine Fault Tolerance consensus process, or a Federated Byzantine Agreement consensus process.

13. The device of claim 10, wherein the message is signed with a private key associated with the first IoT device, wherein the blockchain includes a public key associated with the private key, and wherein the blockchain acts as a certificate authority for the public key for the first IoT device.

14. The device of claim 10, wherein, when authenticating the first IoT device using the blockchain associated with the plurality of IoT devices, the processor is further configured to:

determine that the identity of the first IoT device has been recorded in the blockchain.

15. The device of claim 10, wherein the processor is further configured to:

receive another message, wherein the other message is received from the second IoT device via the second blockchain node; and forward the other message to the first IoT device as an authenticated message.

16. The device of claim 10, wherein the processor is further configured to:

receive another message, wherein the other message is received from a third IoT device via a third blockchain node associated with the blockchain, wherein the third blockchain node is located in a cloud center; and forward the other message to the first IoT device as an authenticated message.

17. The device of claim 10, wherein the processor is further configured to:

receive, by a third blockchain node and via the first base station, another message from a third IoT device to a fourth IoT device;

authenticate, by the third blockchain node, the third IoT device using another blockchain associated with another plurality of IoT devices; and send, by the third blockchain node, the message to the fourth IoT device, in response to authentication the third IoT device using the other blockchain associated with the other plurality of IoT devices.

18. The device of claim 10, wherein the processor is further configured to:

receive a request to register an identity of a third IoT device;

determine that the third IoT device is to be registered with a default blockchain;

distribute the identity of the third IoT device to another plurality of blockchain nodes, wherein the other plurality of blockchain nodes is associated with the default blockchain, via the default blockchain;

determine that consensus has been reached by the default blockchain to add the identity of the third IoT device to the default blockchain; and add the identity of the third IoT device to the default blockchain.

19. A non-transitory computer-readable memory device storing instructions executable by a processor, the non-transitory computer-readable memory device comprising:

one or more instructions to receive, by a first blockchain node and via a first base station, a message from a first Internet of Things (IoT) device to a second IoT device, wherein the first blockchain node is included in a first multi-access edge computing (MEC) device located in a first MEC network associated with the first base station;

one or more instructions to authenticate, by the first blockchain node, the first IoT device using a blockchain associated with a plurality of IoT devices;

one or more instructions to identify, by the first blockchain node, a second blockchain node associated with the second IoT device based on information stored in the blockchain; and one or more instructions to send, by the first blockchain node, the message to the identified second blockchain node in a second MEC device in a second MEC network associated with a second base station servicing the second IoT device, in response to authenticating the first IoT device using the blockchain associated with the plurality of IoT devices.

20. The non-transitory memory device of claim 19, further comprising:

one or more instructions to register an identity of the first IoT device with the blockchain;

one or more instructions to distribute the identity of the first IoT device to a plurality of blockchain nodes, in a plurality of MEC devices associated with the plurality of IoT devices, via the blockchain;

one or more instructions to determine that consensus has been reached by the blockchain to add the identity of the first IoT device to the blockchain; and one or more instructions to add the identity of the first IoT device to the blockchain.

* * * * *